United States Patent
Harth (10) Patent No.: US 7,628,449 B2
(45) Date of Patent: Dec. 8, 2009

(54) VEHICLE SEAT, IN PARTICULAR A MOTOR VEHICLE SEAT

(75) Inventor: Dieter Harth, Kusel (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 150 days.

(21) Appl. No.: 11/816,579

(22) PCT Filed: Jul. 1, 2006

(86) PCT No.: PCT/EP2006/006422

§ 371 (c)(1),
(2), (4) Date: Aug. 17, 2007

(87) PCT Pub. No.: WO2007/006440

PCT Pub. Date: Jan. 18, 2007

(65) Prior Publication Data

US 2008/0143163 A1    Jun. 19, 2008

(30) Foreign Application Priority Data

Jul. 8, 2005   (DE) .................. 10 2005 032 382

(51) Int. Cl.
*B60N 2/36* (2006.01)

(52) U.S. Cl. ............................................. 297/15
(58) Field of Classification Search .............. 297/15
See application file for complete search history.

(56) References Cited

U.S. PATENT DOCUMENTS

| 3,202,453 | A | 8/1965 | Richards |
| 6,196,613 | B1 | 3/2001 | Arai |
| 6,464,297 | B2 * | 10/2002 | Garrido et al. ...... 297/354.11 X |
| 6,540,295 | B1 * | 4/2003 | Saberan et al. ......... 297/378.1 X |
| 6,874,840 | B2 * | 4/2005 | Neale ....................... 297/15 X |
| 7,172,252 | B2 * | 2/2007 | Henning ................. 297/354.13 |
| 2002/0067056 | A1 | 6/2002 | Garrido et al. |
| 2006/0103175 | A1 * | 5/2006 | Fourrey et al. ................ 297/15 |

FOREIGN PATENT DOCUMENTS

| DE | 38 28 659 A1 | 3/1989 |
| DE | 198 11 190 C2 | 12/1999 |
| DE | 199 43 891 C1 | 11/2000 |
| DE | 102 60 277 A1 | 7/2004 |
| EP | 1 407 925 A1 | 4/2004 |
| WO | WO 03/026919 | 4/2003 |

* cited by examiner

*Primary Examiner*—Rodney B White
(74) *Attorney, Agent, or Firm*—McGlew and Tuttle, P.C.

(57) ABSTRACT

A vehicle seat, particularly a motor vehicle seat is provided that includes a seat part structure (3), at least one backrest support (8) which is hingedly connected to the seat part structure (3) in a blockable manner by means of at least one fitting (7), and a backrest structure (4) that is hingedly connected to the backrest support (8) with the aid of a joint (18) and can be blocked along with the backrest support (8) by means of a blocking mechanism (22). The vehicle seat (1) can be transferred from an operative sitting position into a flat inoperative position by unblocking and swiveling the backrest support (8) and/or the backrest structure (4), the unblocked backrest structure (4) swiveling forward and the unblocked backrest support (8) swiveling rearward during the transition from the operative into the inoperative position. The backrest support (8) is unblocked in a force-controlled manner by swiveling the backrest structure (4).

21 Claims, 5 Drawing Sheets

VEHICLE SEAT, IN PARTICULAR A MOTOR VEHICLE SEAT

CROSS REFERENCE TO RELATED APPLICATIONS

This application is a United States National Phase application of International Applicaton PCT/EP2006/006422 and claims the benefit of priority under 35 U.S.C. § 119 of German Patent Application DE 10 2005 032 382.0 filed Jul. 8, 2005, the entire contents of which are incorporated herein by reference.

FIELD OF THE INVENTION

The present invention relates to a vehicle seat, in particular a motor vehicle having a seat part structure, at least one backrest support, which is pivotably attached to the seat part structure by means of at least one fitting, and having a backrest structure that is pivotably attached to the backrest support by means of a joint and that can be locked to the backrest support by means of a locking device, so that the vehicle seat can be converted from a seated use position to a flat non-use position by unlocking and pivoting the backrest support and/or the backrest structure.

BACKGROUND OF THE INVENTION

In a vehicle seat of the type mentioned at the beginning that is disclosed in DE 38 28 659 A1, the backrest structure can be optionally pivoted forwards into a table position, by unlocking its locking device, or backwards into a reclined position, by unlocking the fitting together with the backrest support. In order to load the vehicle it would be desirable, in a number of cases, to have a lower non-use position.

U.S. Pat. No. 6,196,613 B1 proposes a vehicle seat in which the backrest structure is pivotably attached to a base by means of the pivotably attached backrest support and at its lower end it is detachably locked to the base. An inclined position with several use positions is not provided. A seat cushion structure is also pivotably attached to the base by means of pivotably attached rocker s, and at its rear end it is detachably locked to the base. When the transition is made from the use position into the non-use position, the unlocked backrest structure pivots forwards and the backrest support pivots backwards, while independently thereof the seat cushion structure is pivoted forwards by slightly more than 180°. In order to guide the movement, a rail in which rollers run is provided on each side of the vehicle seat, said rollers being provided, on the one hand, at the front end of the seat cushion structure and, on the other hand, at the lower end of the backrest structure. In the non-use position the original underside of the seat cushion structure fits more or less flush and level against the original rear surface of the backrest structure located to the rear of said seat cushion structure.

SUMMARY OF THE INVENTION

The invention is based on the object of improving a vehicle seat of the type mentioned at the beginning.

This object is achieved according to the invention by a vehicle seat with a seat part structure, at least one backrest support, which is pivotably attached to the seat part structure by means of at least one fitting, and having a backrest structure that is pivotably attached to the backrest support by means of a joint and that can be locked to the backrest support by means of a locking device, so that the vehicle seat can be converted from a seated use position to a flat non-use position by unlocking and pivoting the backrest support and/or the backrest structure. When the transition is made from the use position to the non-use position, the unlocked backrest structure pivots forwards and the unlocked backrest support pivots backwards, and the backrest support is positively-controlled unlocked by the pivoting of the backrest structure.

Because of the fact that, when the transition is made from the use position to the non-use position, the unlocked backrest structure pivots forwards and the backrest support, which is positively-controlled unlocked by the backrest structure, pivots backwards, it is possible to achieve a non-use position (floor position) that is lower than a table position and which, in contrast to a reclined position, is suitable for loading purposes. Improvements can be achieved through certain end positions of the hinge and/or by providing a depression in the vehicle structure.

The two locking arrangements, i.e. the fitting and the locking device, permit the backrest support to be simpler in design (for example, it may be just a simple rocker) and also allow for more extensive ranges of motion of the backrest support, whereas for example a four-link mechanism as the backrest support requires just one lock, but on the other hand requires more articulated elements and has a more limited range of motion. Because of the serial interlocking of the backrest structure with the backrest support and of the backrest support with the seat part structure, the backrest that is defined thereby forms a kinematic unit. In a preferred embodiment, the inclination of this kinematic unit is adjustable as a whole by means of the fitting. In order to increase the seating comfort of the occupants, it is sufficient if just the inclination of the backrest structure is adjustable.

The positively-controlled unlocking of the fitting simplifies the actuation by the user, because the latter, for example, merely has to unlock the locking device of the backrest structure, while the backrest structure brings about the unlocking of the backrest support, i.e. acts upon the fitting.

The backrest structure preferably unlocks the fitting by means of a coupling device that is preferably of rigid design. For a special temporal movement sequence the coupling device may provide some free travel, for example a slot-and-pin guide by means of which the positively-controlled unlocking process is delayed and can be adjusted to a certain pivot angle range of the backrest structure.

By unlocking the backrest structure and the backrest support, i.e. by unlocking two locks, two degrees of freedom become available. In order to obtain a clear overall movement, the movements of the unlocked backrest structure and of the unlocked backrest support are preferably to a large extent matched to one another, or coupled with one another, for example by a system of cooperating springs or by a geared connection. A backrest compensation spring may act upon the movement of the backrest support relative to the seat part structure, while a further spring unit acts on the movement of the backrest structure relative to the backrest support or relative to the seat part structure. The end of the spring that is assigned to the component to be moved engages eccentrically with regard to the pivot axis of the component, for example on an arm that is attached to said component or that is attached in a rotationally rigid manner thereto.

Preferably just one backrest support is provided on either side of the vehicle seat, for example in the form of a rocker, and the two backrest supports may be coupled together by transverse connections. This stabilizes the backrest for normal use and in the event of a crash. The springs or geared connections provided for the transition between the use position and the non-use position need to be present only on one side of the vehicle seat, preferably on different sides of the vehicle seat. Thus a spring unit that is provided to act on the movement of the backrest structure can contribute towards compensating for the backrest weight when adjusting the inclination.

The invention is explained in more detail below with reference to two exemplary embodiments illustrated in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, in the first exemplary embodiment a vehicle seat 1 is provided for a rear row, in particular a third row of seats of a motor vehicle, wherein the arrangement of the vehicle seat 1 within the motor vehicle and its customary direction of travel define the directional data used below. As parts of its load-bearing structure the vehicle seat 1 has a seat part structure 3 and a backrest structure 4 that are upholstered in a known manner. In order to lower or fold forward the seat cushion of the vehicle seat 1, the seat part structure 3 itself can be articulately designed. In the present case, the seat part structure 3 is rigidly attached to the vehicle structure S of the motor vehicle, but it could also be longitudinally adjustable relative to the vehicle structure by means of seat rails. On both sides of the vehicle seat a fitting 7 is provided on the seat part structure 3, and by means of each said fitting a backrest support 8 designed as a rocker is pivotably and lockably attached to the seat part structure 3. Together with the upholstered backrest structure 4, the two backrest supports 8 define the backrest of the vehicle seat 1. Initially, a description is given of a seated use position of the vehicle seat 1.

In the present case the fitting 7 is designed as a detent fitting, of the kind described for example with regard to its internal design in WO 00/44582 A1 and with regard to its external design in A1, the disclosure content of which is explicitly included here. One of the two fitting parts is firmly attached to the back end of the seat part structure 3 and the other fitting part is firmly connected to the lower end of the backrest support 8. But it is also possible to use as a fitting 7 a geared fitting with a pivot-free function, of the kind described for example in DE 100 48 127 A1, the disclosure content of which is also explicitly included here.

Figure 1:
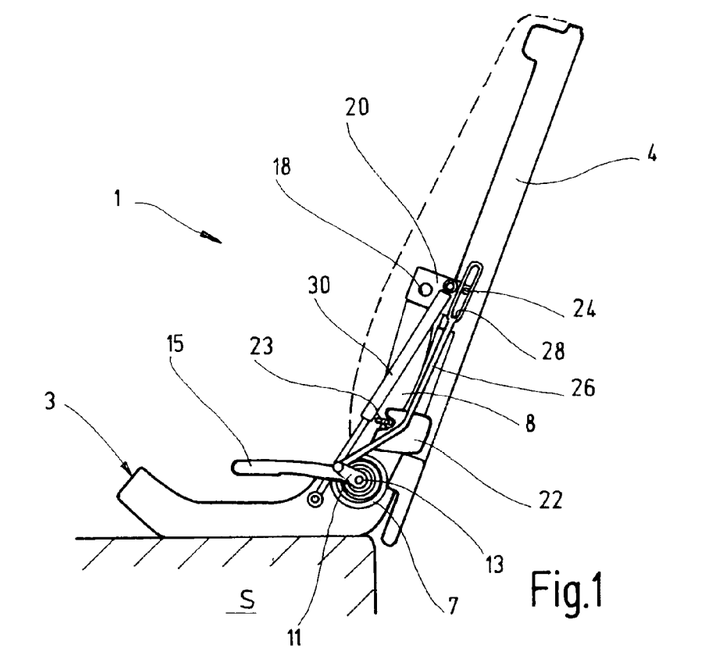
FIG. 1 is a lateral view of the first exemplary embodiment, shown in the use position, with the upholstery shown schematically in dash line.
Figure 4:
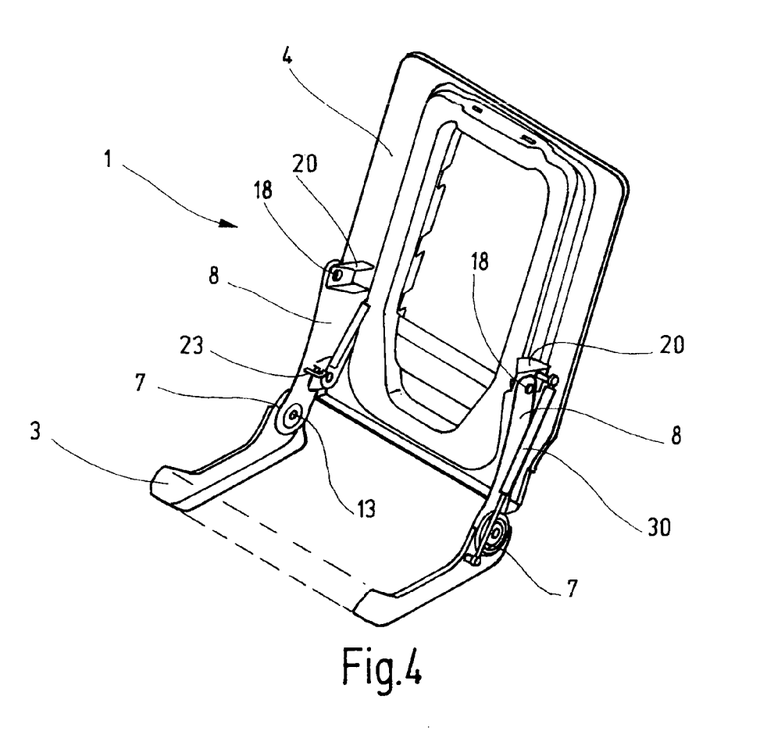
FIG. 4 is a perspective partial view of the first exemplary embodiment.

The fitting 7, which is normally locked, can be unlocked by means of a first actuating element 11, said first actuating element 11, which is designed as a bell crank, rotating a shaft 13. A shaft 13 can be provided for each fitting 7 or a common shaft 13 can be provided for both fittings 7, said shaft coupling the two fittings 7 and permitting synchronous unlocking by means of a single first actuating element 11. The shaft 13 is aligned with the axis of rotation of the fittings 7, i.e. the pivot axis of the backrest supports 8, relative to the seat part structure 3. In order to permit adjustment of the inclination of the backrest, the fitting 7 (shown in the Figure as a detent fitting) can be unlocked by means of a second actuating element 15, which in the present case is designed as a lever handle. The second actuating element 15 is connected in a rotationally rigid manner with the first actuating element 11 or acts directly on the shaft 13, for which purpose driver means or uncoupling means can be provided. A backrest compensation spring 17, which in the present case is designed as a spiral spring, acts between the seat part structure 3 and the backrest support 8 or the fitting parts attached thereto. When the fitting parts 7 are unlocked, the backrest compensation spring 17 compensates for at least part of the weight of the entire backrest.

The backrest structure 4 is pivotably attached to the backrest support 8 on either side of the vehicle seat by means of a joint 18 designed as a pivot bearing. The joint 18 between the upper end of the backrest support 8 and a forward-projecting arm 20 of the backrest structure 4 is provided in the lower half of the latter. The axes of rotation defined by the joints 18 are in alignment with each other and define the pivot axis of the backrest structure 4 relative to the backrest supports 8. In the use position, the rear side of the backrest structure 4 points substantially in the rearwards direction, slightly inclined to the horizontal.

At the bottom end of the backrest structure 4 a locking device 22 is provided on at least one side of the vehicle seat, in the present case on both sides. In the present case the locking device 22 is designed as a lock, as described for example in DE 203 02 007 U1, the disclosure content of which is explicitly incorporated here. By means of this locking device 22 mounted on the backrest structure 4 said backrest structure 4 is detachably locked to the associated backrest support 8, or more accurately stated to a counter element 23 on the associated backrest support 8, namely in the present case a locking stirrup on the backrest support 8. The positions of the locking device 22 and the counter element 23 are interchangeable. As a result, the backrest defined by the backrest structure 4 and the backrest supports 8 forms a kinematic unit in the use position. Several use positions of this unit can be adjusted by means of the fittings 7, i.e. the inclination of the backrest, in particular of the backrest structure 4, can be adjusted. Instead of the combination consisting of the joint 18 and the locking device 22, it is also possible to provide a fitting of the type characterized by fitting 7.

On at least one side of the vehicle seat, a control pin 24 that is rigidly attached to the backrest structure projects laterally from the arm 20, or it is located elsewhere on the backrest structure 4. A coupling element 26 is pivotably attached at one end to the first actuating element 11, and is rotatably, and to a limited extent slidingly, coupled at the other end to the control pin 24 by means of a slot 28 encompassing the latter. A spring unit 30, which in the present case is a gas spring used as a tension spring, is attached to the one hand to the seat part structure 3 and on the other hand to the arm 20. The latter components may be provided on one side or on either side of the vehicle seat.

Figure 2:
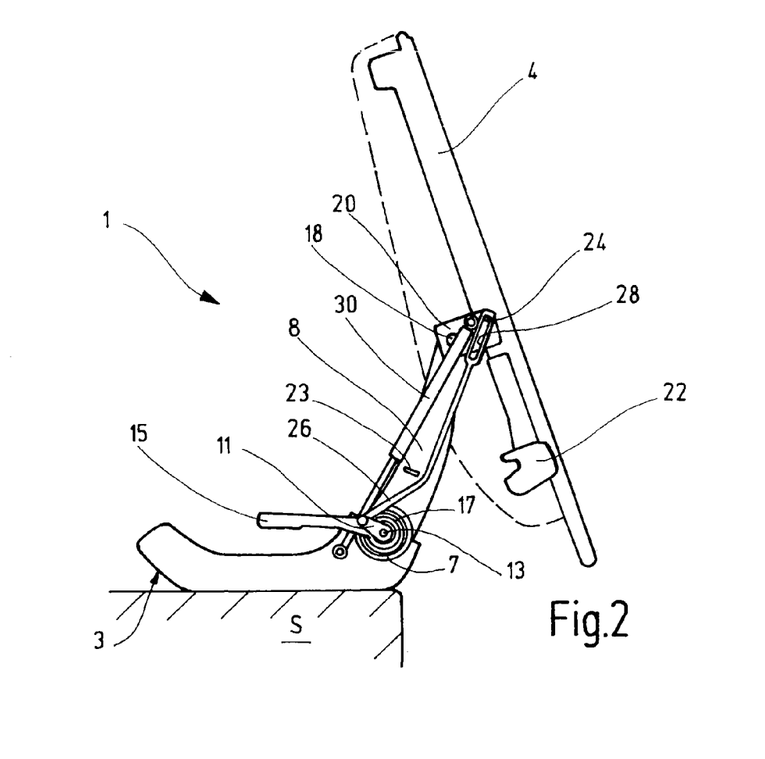
FIG. 2 is a lateral view, corresponding to FIG. 1, shown in an intermediate position.

The vehicle seat 1 can be converted from the use position into a flat floor position or non-use position. For this purpose—possibly after lowering or folding over the seat cushion—the locking device 22 is unlocked and the backrest structure 4 is pivoted forwards relative to the backrest support 8 around the joint 18. Initially, the spring unit 30 acts against this movement. The guide pin 24 moves upwards in the slot 28, i.e. it travels free for a certain distance. In a particular intermediate position, i.e. at a certain pivot angle or at least in a certain pivot angle range of the backrest structure 4, for example when the spring unit 30 goes beyond a dead center position, the guide pin 24 reaches the end of the slot 28 and takes the coupling link 26 with it, said coupling link 26 positively-controlled unlocking the fitting 7 by means of the first actuating element 11.

Figure 3:
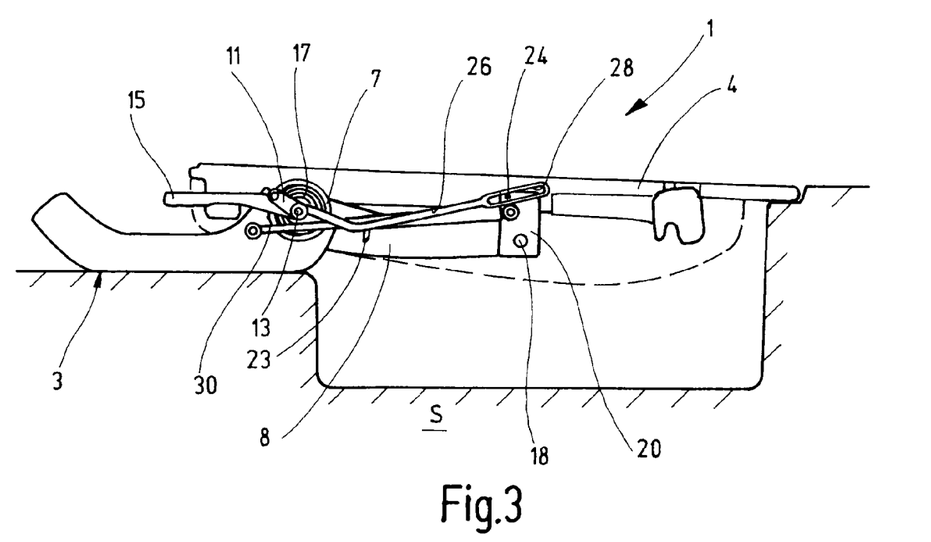
FIG. 3 is a lateral view, corresponding to FIG. 1, shown in the non-use position.

When both fittings 7 are unlocked, the backrest supports 8 can be pivoted backwards into the horizontal position. At the same time, the backrest structure 4 continues its pivoting motion towards the horizontal. As this happens, the guide pin 24 moves back in the slot 28. The torque built up by the backrest compensation spring 17 in a forwards or upwards direction can be at least approximately compensated for, when suitably matched, by the torque built up by the spring unit 30 in a downwards direction. At the same time, the interplay between the backrest compensation spring 17 and the spring unit 30 defines to a large extent the coordination of movement or the forced guidance of the backrest structure 4 and the backrest support 8. The coordination of movement can also be achieved by a geared connection of the fitting 7 and of the joint 18, for example by means of gearwheels and toothed belts.

The non-use position is achieved when not only the backrest supports 8 but also the backrest structure 4 have at least approximately reached the horizontal position. These last-mentioned components of the backrest, together with the upholstery, can be partially accepted by a depression in the vehicle structure S. As a rule, the previously upper part of the backrest is arranged above the seat part structure 3, while the previously lower part extends into the depression. In the present case, because of the interplay between the movements, the particular situation is achieved in which the backrest structure 4 comes to rest with its formerly lower and now rear end on the vehicle structure S or, more exactly stated, when the non-use position is reached it places itself in a suitable receiving part of the vehicle structure S. The original rear side of the backrest structure 4 now faces upwards and fits flush and level with the fixed part of the cargo area floor located to the rear, and itself forms part of the now continuous cargo area floor. It is now possible to secure the non-use position by again locking the fittings 7 and/or the locking devices 22 to appropriately positioned counter elements.

Figure 5:
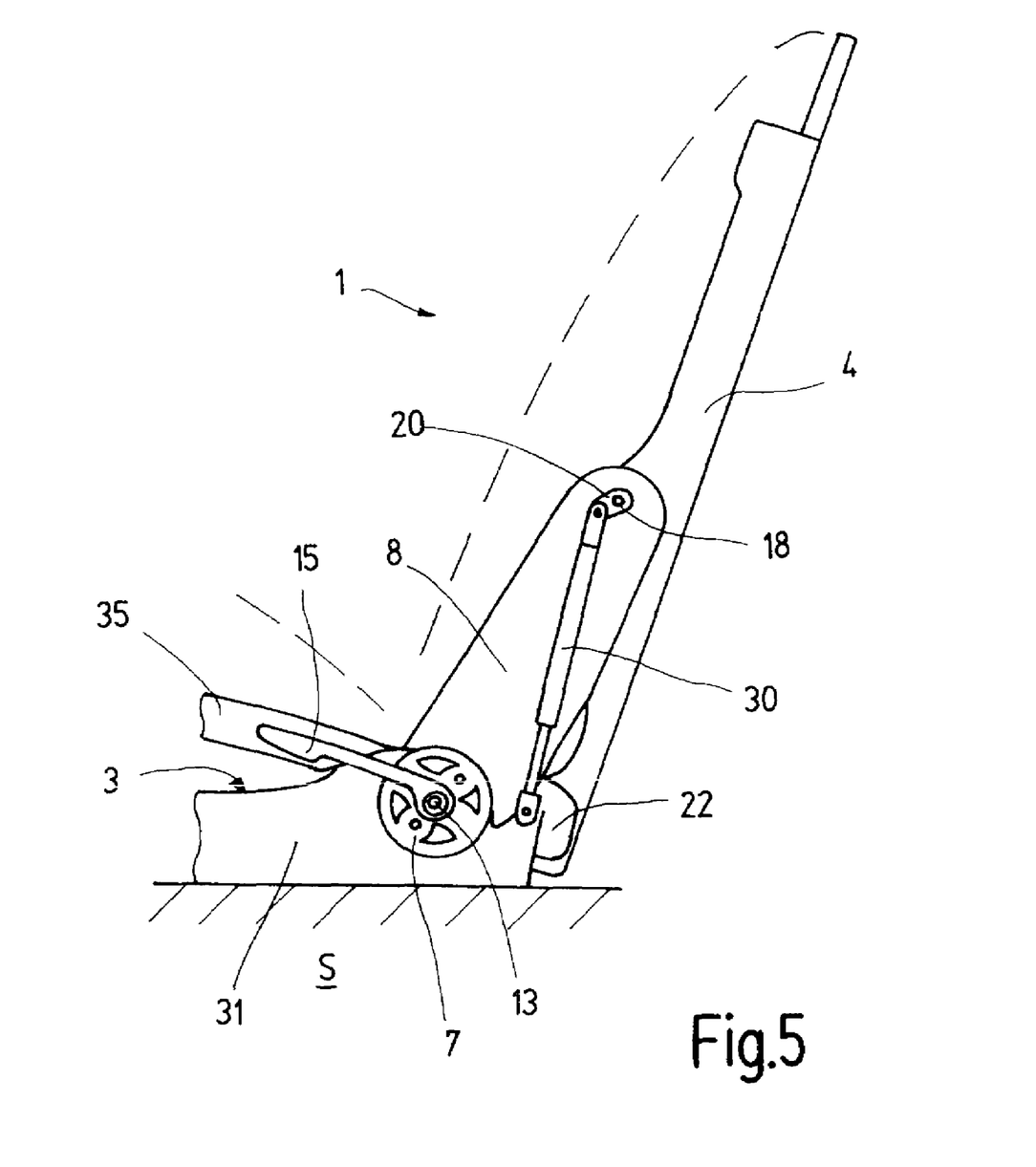
FIG. 5 is a partially cut away view of the outer side of the second exemplary embodiment.
Figure 6:
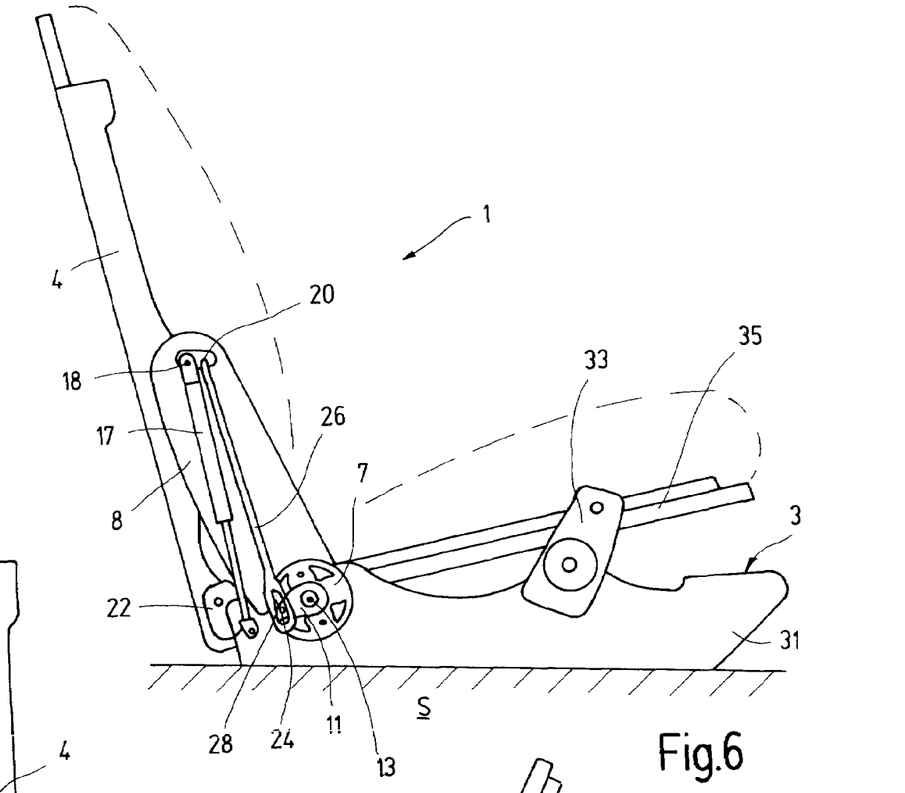
FIG. 6 is a view of the inner side of the second exemplary embodiment, shown in the use position, with the upholstery shown schematically in dash line.

Unless otherwise described below, the second exemplary embodiment is the same as the first exemplary embodiment, which is why the same and identically functioning components bear the same reference numbers. In the case of the vehicle seat 1 the seat part structure 3, the backrest structure 4, the fittings 7 and the backrest supports 8 are identical in design. The backrest structure 4 is pivotably attached to the backrest supports 8 by means of the joints 18 on either side of the vehicle seat and—through the cooperation of the respective locking device 22 with the associated counter element 23 of the associated backrest support 8—is locked to the said backrest support 8. The two actuating elements 11 and 15 can in each case rotate the shaft 13 which unlocks the fittings 7.

The first actuating element 11 is arranged at the end of the shaft 13 that is arranged on the side of the vehicle seat that is closer to the center of the vehicle, which is referred to for short as the inner side of the vehicle seat 1. The second actuating element 15 is arranged at the end of the shaft 13 that is arranged on the side of the vehicle seat that is closer to the outside of the vehicle, which is referred for short as the outer side of the vehicle seat 1.

On the inner side of the vehicle seat 1 the arm 20 is arranged in the area of the assigned joint 18 and is connected in a rotationally rigid manner with the backrest structure 4. The upper end of the backrest compensation spring 17 is aligned with the pivot axis of the backrest structure 4, said pivot axis being defined by the joints 18, and is pivotably attached for example to a bearing pin of the joint 18. In the present case, the backrest compensation spring 17 is in the form of a gas spring. The lower end of the backrest compensation spring 17 is pivotably attached to the seat part structure. The upper end of the coupling element 26 is pivotably attached to the arm 20, i.e. eccentrically to the joint 18. The coupling element 26 is arranged in such a manner that the slot 28 is located at the lower end. By means of the slot 28 the coupling element 26 encloses the guide pin 24. The guide pin 24 is arranged on the first actuating element 11, namely eccentrically to the pivot axis of the fittings 7, with which axis the shaft 13 is in alignment.

On the outer side of the vehicle seat 1, in the area of the assigned joint 18, a further arm 20 is arranged that is also attached in a rotationally rigid manner to the backrest structure 4. The upper end of the spring unit 30 is pivotably attached to this arm 20, i.e. eccentrically to the joint 18. In the present case, the spring unit 30 is designed as a gas spring. The lower end of the spring unit 30 is pivotably attached to the seat part structure 3.

Figure 7:
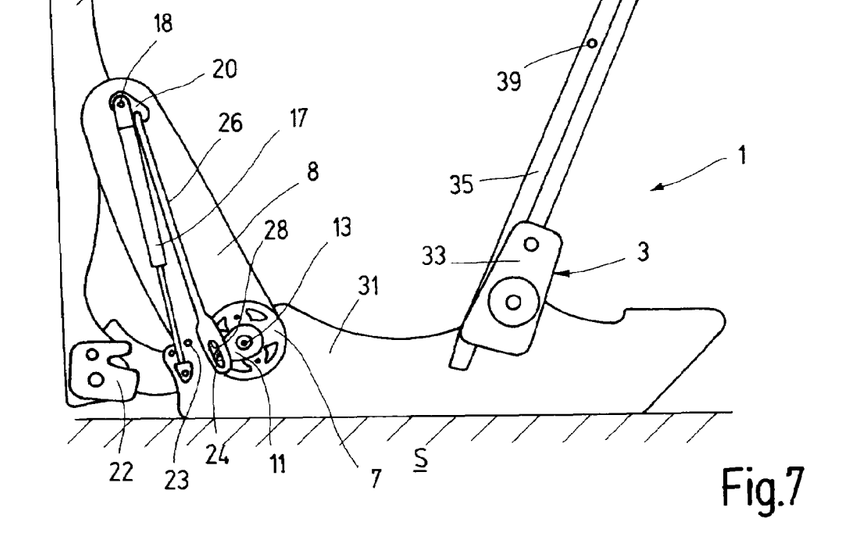
FIG. 7 is a lateral view, corresponding to FIG. 6, shown in an intermediate position.
Figure 8:
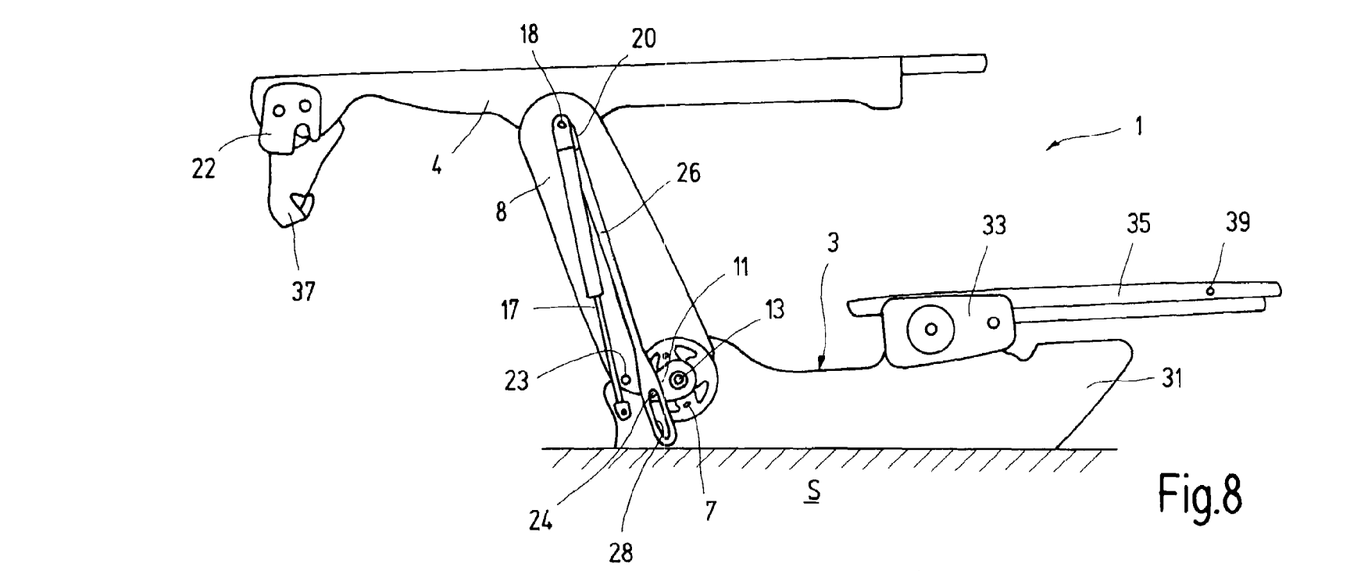
FIG. 8 is a lateral view, corresponding to FIG. 6, shown in a further intermediate position.
Figure 9:
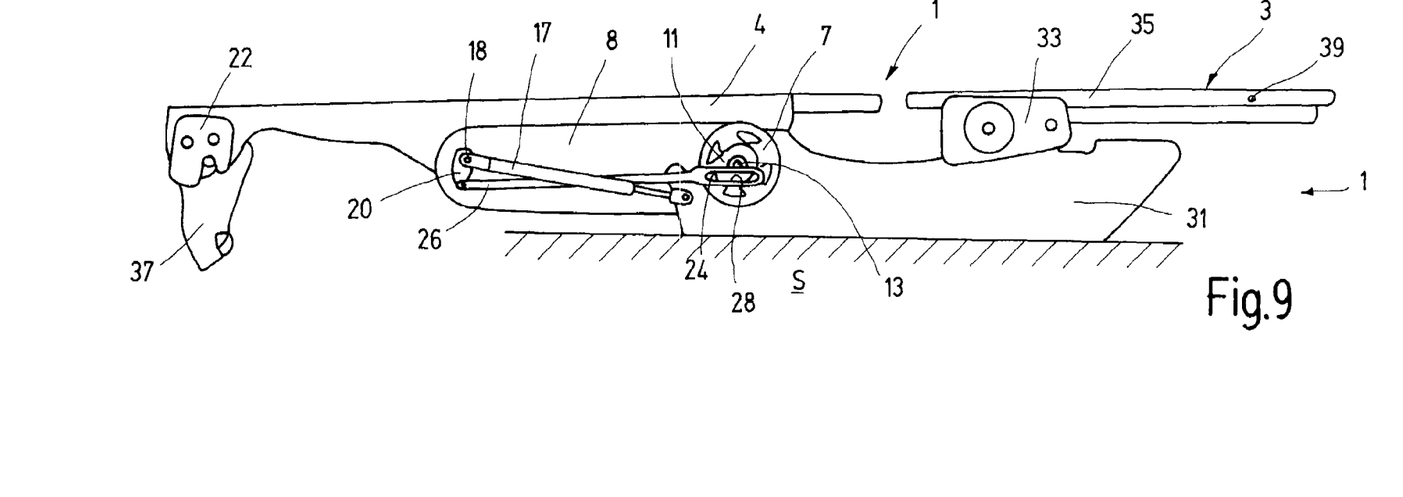
FIG. 9 is a lateral view, corresponding to FIG. 6, shown in the non-use position.

The method of functioning of the second exemplary embodiment, with the components described above, is the same as that of the first exemplary embodiment.

The seat part structure 3 that so far has been referred to in both exemplary embodiments in merely general terms as an assembly consists of a base 31, two rockers 33 and a seat cushion structure 35. The base 31 is that part of the seat part structure 3 described so far that is connected directly or indirectly with the vehicle structure S, and it is also the part to which the fittings 7 and one end of the two springs 17 and 30 are directly or indirectly attached. One end of each of the two rockers 33 is pivotably attached on each side of the vehicle seat. The other end of each rocker 33 is pivotably attached to the seat cushion structure 35. The corresponding joints on either side of the vehicle seat are in alignment with each other. Instead of being pivotably attached by means of the rockers 33 and their respective two pivot axes, in a modified embodiment the seat cushion structure 35 can be pivotably attached directly to the base 31, i.e. by means of a single pivot axis defined by two joints in alignment with each other.

Together with its upholstery, the seat cushion structure 35 defines the seat cushion of the vehicle seat 1. Springs may act and build up pretension between the base 31 and the rockers 33 and/or between the rockers 33 and the seat cushion structure 35. In the use position, the underside of the seat cushion structure 35 points substantially downwards, at a slight angle to the vertical.

In the use position of the vehicle seat 1, the seat cushion structure 35 is locked by means of at least a second locking device 37, for example a lock provided on either side of the backrest structure 4 (or on the backrest support 8 or on the base 31), and a second counter element 39 cooperating therewith, e.g. a pin provided on either side of the seat cushion structure 35. The positions of the second locking device 37 and of the second counter element 39 are interchangeable. In a modified embodiment, instead of using locking means, the backrest structure 4 can hold the seat cushion structure 35 in the use position, for example by positive means such as a stop or a receiving part.

When the transition is made from the use position to the non-use position, not only does the above-described relative movement of the backrest structure 4, backrest support 8 and seat part structure 3 (more accurately stated, the base 31 thereof) take place, but also the second locking device 37 is unlocked. When the backrest structure 4 has reached approximately a vertical intermediate position, it allows the seat cushion structure 35 to pivot within its pivot range. The seat cushion structure 35 is then pivoted forwards, in the present case by slightly more than 180°, so that the original underside of the seat cushion structure 35 is horizontally oriented and points upwards. In the present case, this movement is supported by the said pretension built up by the springs on the rockers 33, and it therefore takes place automatically.

In the non-use position, the original underside of the seat cushion structure 35 adjoins more or less flush and level with the original rear side of the backrest structure 4 positioned to the rear thereof and thus forms a further part of the now continuous cargo area floor. In the preferred case, in which the vehicle seat 1 is used in the third row of seats, a non-use position is preferably provided for the vehicle seats in the second row of seats, and in this non-use position the original rear side of the associated backrest of the second row of seats adjoins more or less flush and level with the original underside of the seat cushion structure 35 of the third row of seats. As a result, the cargo area floor is even more enlarged.

While specific embodiments of the invention have been shown and described in detail to illustrate the application of the principles of the invention, it will be understood that the invention may be embodied otherwise without departing from such principles.

LIST OF REFERENCE NOS.

1 Vehicle seat
3 Seat part structure
4 Backrest structure
7 Fitting
8 Backrest support
11 First actuating element
13 Shaft
15 Second actuating element
17 Backrest compensation spring
18 Joint
20 Arm
22 Locking device
23 Counter element
24 Guide pin
26 Coupling element
28 Slot
30 Spring unit
31 Base
33 Rocker
35 Seat cushion structure
37 Second locking device
39 Second counter element
S Vehicle structure

The invention claimed is:

1. A vehicle seat comprising:
a seat part structure;
a fitting;
a backrest support pivotably attached to the seat part structure by means of the fitting;
a joint;
a backrest structure pivotably attached to the backrest support by means of the joint;
a locking device for locking the backrest structure to the backrest support, so that the vehicle seat can be converted from a seated use position to a flat non-use position by unlocking and pivoting the backrest support and/or the backrest structure the backrest structure pivoting forwards, in an unlocked state in transition from the use position to the non-use position and the unlocked backrest support pivoting backwards, in an unlocked state in transition from the use position to the non-use position, wherein when the transition is made from the use position to the non-use position, initially only the locking device is unlocked and the backrest structure pivots which, in an intermediate position in a certain pivot angle range, positively engages the fitting; and
positive control means for a positively controlled unlocking of the backrest support by the pivoting of the backrest structure.

2. A vehicle seat according to claim 1, wherein the positive control means comprises a coupling element provided between the backrest structure and a first actuating element of the fitting.

3. A vehicle seat according to claim 2, wherein the coupling element provides a free travel path that is traversed in a certain pivot angle range of the backrest structure causing the coupling element to come into play.

4. A vehicle seat according to claim 3, wherein in order to achieve the free travel path, the backrest structure or the first actuating element has a pin, and the coupling element has a slot cooperating therewith at the associated end.

5. A vehicle seat according to claim 1, further comprising: springs and/or a geared connection for matching the movements of the unlocked backrest structure and of the unlocked backrest support to one another.

6. A vehicle seat according to claim 5, wherein in a particular pivot angle range of the backrest structure one of the springs passes through a dead center position.

7. A vehicle seat according to claim 1, wherein in the non-use position the joint is arranged at a lower point than the fitting.

8. A vehicle seat according to claim 1, wherein in the non-use position a depression in the vehicle structure at least partially accepts a backrest comprising the backrest support, the backrest structure and the upholstery thereof.

9. A vehicle seat according to claim 1, wherein in the use position, the inclination of the backrest structure can be adjusted by means of the fitting.

10. A vehicle seat according to claim 1, wherein the seat part structure comprises a seat cushion structure pivotable from a use position into a non-use position, relative to a base, by means of at least one rocker, or directly around a pivot axis.

11. A vehicle seat according to claim 10, wherein the pivoting from the use position into the non-use position is accomplished by pretension that is built up by springs between the base and a seat cushion structure, as soon as the backrest structure has reached a certain intermediate position.

12. A vehicle and seat combination comprising:
a vehicle;
a seat connected to the vehicle, the seat comprising:
a seat part structure;
a fitting;
a backrest support pivotably attached to the seat part structure by means of the fitting;
a joint;
a backrest structure pivotably attached to the backrest support by means of the joint;
a locking device for locking the backrest structure to the backrest support, so that the vehicle seat can be converted from a seated use position to a flat non-use position by unlocking and pivoting the backrest support and/or the backrest structure the backrest structure pivoting forwards, in an unlocked state in transition from the use position to the non-use position and the unlocked backrest support pivoting backwards, in an unlocked state in transition from the use position to the non-use position; and unlocking means for changing the connection state of the backrest support from a blocked state in the use position to an unblocked state allowing pivoting movement of the backrest support to the non-use position by the pivoting of the backrest structure, the unlocking means providing a controlled positive connection between the backrest structure and the backrest support, said unlocking means comprising a coupling element provided between the backrest structure and a first actuating element of the fitting, the actuating element of the fitting releasing the backrest support connection state from a blocked state in the use position to an unblocked state allowing pivoting movement of the backrest support, wherein when the transition is made from the use position to the non-use position, initially only the locking device is unlocked and the backrest structure pivots which, in an intermediate position in a certain pivot angle range, positively engages the fitting via the coupling element.

13. A vehicle and seat combination according to claim 12, wherein the coupling element is mounted to provide a free travel path that is traversed in a certain pivot angle range of the backrest structure causing the coupling element to come into play, the backrest structure or the first actuating element has a pin, and the coupling element has a slot cooperating therewith at the associated end to define a free travel path.

14. A vehicle and seat combination according to claim 13, further comprising: springs and/or a geared connection for matching the movements of the unblocked backrest structure and of the unblocked backrest support to one another wherein in a particular pivot angle range of the backrest structure one of the springs passes through a dead center position.

15. A vehicle and seat combination according to claim 12, wherein the vehicle comprises a structure surface defining a depression and wherein in the non-use position the depression at least partially accepts a portion of one or more of the backrest support, the backrest structure and the upholstery thereof.

16. A vehicle and seat combination according to claim 12, wherein the seat part structure comprises a seat cushion structure pivotable from a use position into a non-use position, relative to a base, by means of at least one rocker, or directly around a pivot axis.

17. A vehicle and seat combination according to claim 16, wherein the pivoting from the use position into the non-use position is accomplished by pretension that is built up by springs between the base, and a seat cushion structure, as soon as the backrest structure has reached a certain intermediate position.

18. A vehicle seat comprising:
a seat part structure;
a fitting;
a backrest support pivotably attached to the seat part structure by means of the fitting;
a joint;
a backrest structure pivotably attached to the backrest support by means of the joint;
a locking device for locking the backrest structure to the backrest support, so that the vehicle seat can be converted from a seated use position to a flat non-use position by unlocking and pivoting the backrest support and/or the backrest structure, the backrest structure pivoting forwards, in an unlocked state in transition from the use position to the non-use position and the unlocked backrest support pivoting backwards, in an unlocked state in transition from the use position to the non-use position; and positive control means for a positively controlled unlocking of the backrest support by the pivoting of the backrest structure, said positive control means comprising a coupling element provided between the backrest structure and a first actuating element of the fitting, said coupling element providing a free travel path that is traversed in a certain pivot angle range of the backrest structure causing the coupling element to come into play.

19. A vehicle seat comprising:
a seat part structure;
a fitting;
a backrest support pivotably attached to the seat part structure by means of the fitting;
a joint;
a backrest structure pivotably attached to the backrest support by means of the joint;
a locking device for locking the backrest structure to the backrest support, so that the vehicle seat can be converted from a seated use position to a flat non-use position by unlocking and pivoting the backrest support and/or the backrest structure, the backrest structure pivoting forwards, in an unlocked state in transition from the use position to the non-use position and the unlocked backrest support pivoting backwards, in an unlocked state in transition from the use position to the non-use position;
springs and/or a geared connection for matching the movements of the unlocked backrest structure and of the unlocked backrest support to one another, wherein in a particular pivot angle range of the backrest structure one of the springs passes through a dead center position; and
positive control means for a positively controlled unlocking of the backrest support by the pivoting of the backrest structure.

20. A vehicle seat comprising:
a seat part structure;
a fitting;
a backrest support pivotably attached to the seat part structure by means of the fitting;
a joint;
a backrest structure pivotably attached to the backrest support by means of the joint;
a locking device for locking the backrest structure to the backrest support, so that the vehicle seat can be converted from a seated use position to a flat non-use position by unlocking and pivoting the backrest support and/or the backrest structure, the backrest structure pivoting forwards, in an unlocked state in transition from the use position to the non-use position and the unlocked backrest support pivoting backwards, in an unlocked state in transition from the use position to the non-use position, wherein in the non-use position the joint is arranged at a lower point than the fitting; and
positive control means for a positively controlled unlocking of the backrest support by the pivoting of the backrest structure.

21. A vehicle seat comprising:
a seat part structure, said seat part structure comprising a seat cushion structure pivotable from a use position into a non-use position, relative to a base, by means of at least one rocker, or directly around a pivot axis;

a fitting;

a backrest support pivotably attached to the seat part structure by means of the fitting;

a joint;

a backrest structure pivotably attached to the backrest support by means of the joint, wherein the pivoting from the use position into the non-use position is accomplished by pretension that is built up by springs between the base and said seat cushion structure, as soon as the backrest structure has reached a certain intermediate position;

a locking device for locking the backrest structure to the backrest support, so that the vehicle seat can be converted from a seated use position to a flat non-use position by unlocking and pivoting the backrest support and/or the backrest structure, the backrest structure pivoting forwards, in an unlocked state in transition from the use position to the non-use position and the unlocked backrest support pivoting backwards, in an unlocked state in transition from the use position to the non-use position; and positive control means for a positively controlled unlocking of the backrest support by the pivoting of the backrest structure.

* * * * *